(12) United States Patent
Olafsson et al.

(10) Patent No.: US 12,543,661 B2
(45) Date of Patent: Feb. 10, 2026

(54) GREENHOUSE

(71) Applicant: Gentle Green B.V., Naaldwijk (NL)

(72) Inventors: Hlodver Por Olafsson, Welwyn (GB); Arnoud Nicolaas Tieleman, Champfromier (FR)

(73) Assignee: GENTLE GREEN B.V., Naaldwijk (NL)

( * ) Notice: Subject to any disclaimer, the term of this patent is extended or adjusted under 35 U.S.C. 154(b) by 716 days.

(21) Appl. No.: 17/621,925

(22) PCT Filed: Jun. 19, 2020

(86) PCT No.: PCT/EP2020/067240
§ 371 (c)(1),
(2) Date: Dec. 22, 2021

(87) PCT Pub. No.: WO2020/260170
PCT Pub. Date: Dec. 30, 2020

(65) Prior Publication Data
US 2022/0264809 A1    Aug. 25, 2022

(30) Foreign Application Priority Data

Jun. 24, 2019 (GB) .................................. 1909028

(51) Int. Cl.
*A01G 9/24* (2006.01)
*A01G 9/14* (2006.01)

(52) U.S. Cl.
CPC ............ *A01G 9/246* (2013.01); *A01G 9/247* (2013.01); *A01G 9/14* (2013.01)

(58) Field of Classification Search
CPC .......... A01G 9/246; A01G 9/247; A01G 9/14; F24F 8/10; F24F 2110/10; F24F 2110/20;
(Continued)

(56) References Cited

U.S. PATENT DOCUMENTS

2014/0150336 A1* 6/2014 Houweling ............... A01G 9/24
                                                                    47/17
2016/0051922 A1   2/2016 Horng
(Continued)

FOREIGN PATENT DOCUMENTS

EP    1795691    6/2007
EP    2853831    4/2015
(Continued)

*Primary Examiner* — Steven B McAllister
*Assistant Examiner* — Charles R Brawner
(74) *Attorney, Agent, or Firm* — MH2 Technology Law Group, LLP

(57) ABSTRACT

Greenhouse, comprising a substantially airtight enclosure having an interior space, comprising a crop space in which crops are to be grown, and a climate control chamber configured to control a climate in the crop space, comprising at least one air inlet opening and at least one air outlet opening through which an interior of the chamber is in fluid communication with the crop space, an air displacement means configured to create an air flow from the crop space to the interior of the chamber through the at least one air inlet opening, and from the interior of the chamber to the crop space through the at least one air outlet opening, and an air conditioning means configured to condition air in the interior of the chamber such that a conditioned climate is created in the interior of the chamber, wherein the climate control chamber is configured and located relative to the crop space such that the at least one air inlet opening and the at least one air outlet opening of the climate control chamber are distributed across the crop space such that the chamber both receives and delivers air from and to the crop space, respectively, locally at a plurality of locations distributed across the crop space, and wherein the climate control chamber comprises one or more climate control chambers.

20 Claims, 8 Drawing Sheets

(58) Field of Classification Search
CPC ...... F24F 2110/30; F24F 2110/70; F24F 5/00;
F24F 7/065; F24F 7/08; Y02A 40/25;
Y02B 30/70; Y02P 60/14
USPC .......................................................... 454/236
See application file for complete search history.

(56) References Cited

U.S. PATENT DOCUMENTS

| | | | |
|---|---|---|---|
| 2016/0157440 A1* | 6/2016 | Looije .................... | A01G 9/246 47/17 |
| 2018/0156481 A1* | 6/2018 | Carpenter ................. | F24F 7/08 |
| 2019/0150376 A1 | 5/2019 | Spaans | |
| 2019/0289794 A1* | 9/2019 | Matsumura ............ | A01G 9/246 |
| 2020/0124311 A1* | 4/2020 | Keogh .................. | F24F 1/0035 |
| 2020/0224900 A1* | 7/2020 | Lee ....................... | F24F 11/0008 |

FOREIGN PATENT DOCUMENTS

| | | |
|---|---|---|
| EP | 3473942 | 4/2019 |
| WO | 0171260 | 9/2001 |
| WO | 2015012698 | 1/2015 |
| WO | 2017173001 | 10/2017 |

\* cited by examiner

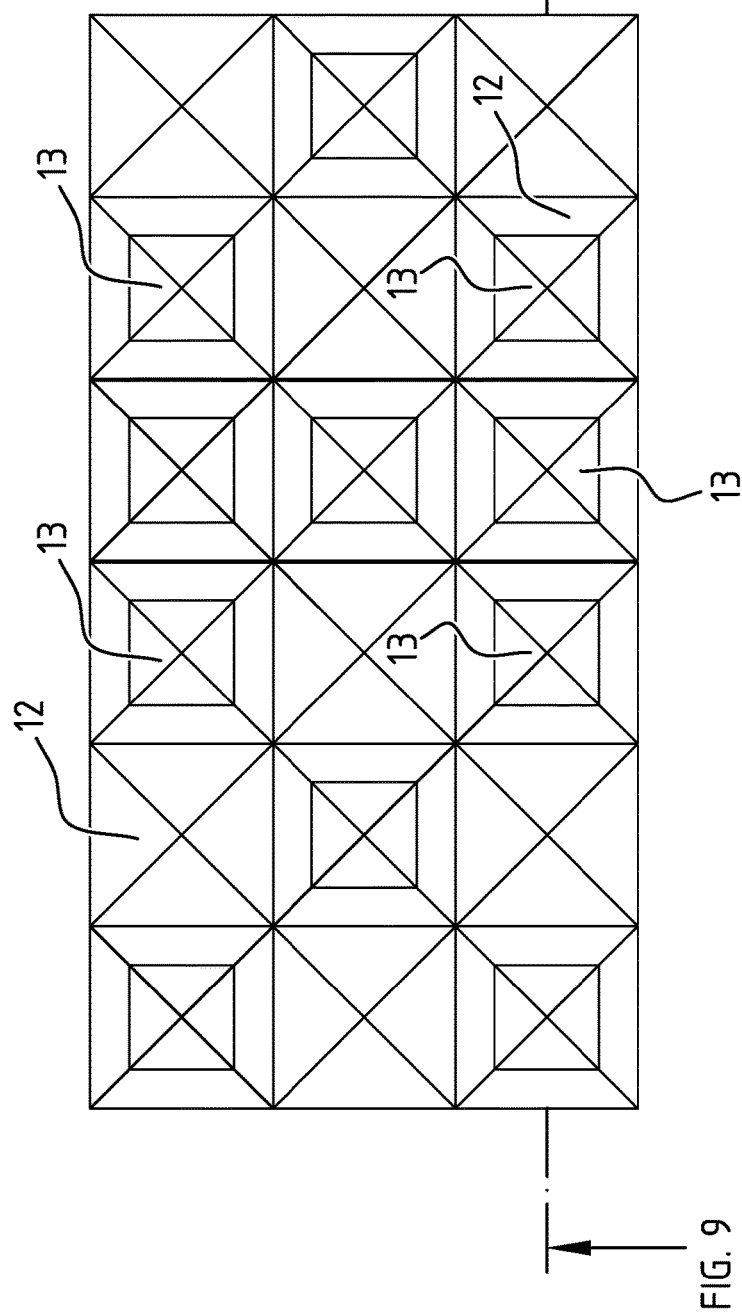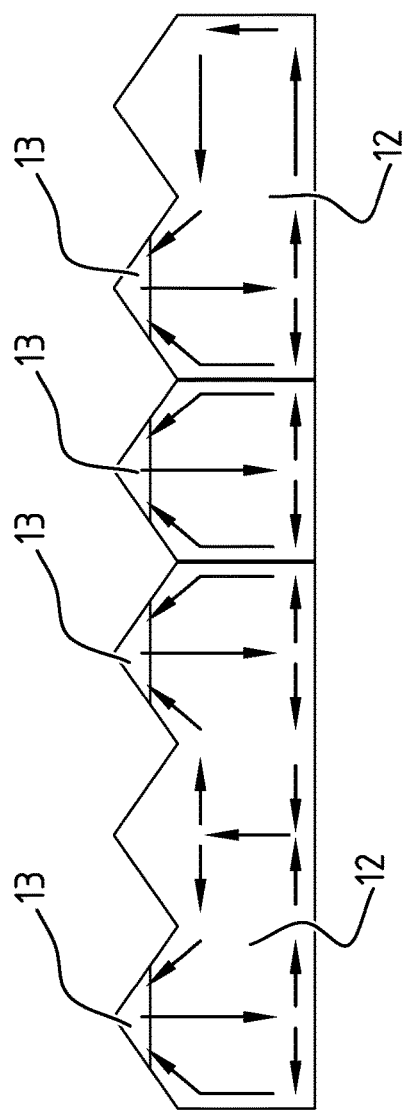

GREENHOUSE

The present invention relates to a greenhouse.

Sustainable, high-volume vegetable and fruit production is becoming increasingly important as vegetables and fruit are a pillar for global food provision. Compared to meat, seafood, dairy, poultry, beans and other food categories, vegetables and fruits provide the highest positive impact on human health and the best environmental footprint. Accordingly, greenhouses play a major role in the world's food production and this role is expected to grow considerably as the earth's population grows and food resources become increasingly plant based.

However, the traditional design of a greenhouse has a significant negative impact on the environment, due to high energy consumption, high water usage and pesticide use, for example. For instance, many traditional greenhouses use the opening of windows or similar air outlets to decrease the temperature in the greenhouse by exiting air from the greenhouse to the outside. In doing so, these greenhouses lose a tremendous amount of energy, water and $CO_2$.

Moreover, in areas of the world where the outdoor climate is hot and humid for at least part of the year, traditional greenhouses are not able to economically create an indoor climate that is adequate for efficient plant growth.

Therefore, it is an object of the present invention to provide a resource-efficient and outdoor climate-independent greenhouse.

The present invention provides thereto a greenhouse, comprising a substantially airtight enclosure having an interior space, comprising a crop space in which crops are to be grown, and a climate control chamber configured to control a climate in the crop space, comprising at least one air inlet opening and at least one air outlet opening through which an interior of the chamber is in fluid communication with the crop space, an air displacement means configured to create an air flow from the crop space to the interior of the chamber through the at least one air inlet opening, and from the interior of the chamber to the crop space through the at least one air outlet opening, and an air conditioning means configured to condition air in the interior of the chamber such that a conditioned climate is created in the interior of the chamber, wherein the climate control chamber is configured and located relative to the crop space such that the at least one air inlet opening and the at least one air outlet opening of the climate control chamber are distributed across the crop space such that the chamber both receives and delivers air from and to the crop space, respectively, locally at a plurality of locations distributed across the crop space, and wherein the climate control chamber comprises one or more climate control chambers.

Due to the specific configuration of the climate control chamber, which comprises one or more climate control chambers, and its specific location in the interior space of the greenhouse enclosure, the at least one air inlet opening and the at least one air outlet opening of the climate control chamber are distributed across the crop space such that air from the crop space is both received and delivered locally, i.e. close to the crops to be grown in the crop space, at a plurality of locations across the crop space, so that the air conditioning also takes place locally at the plurality of locations. Due to this local climate creation and delivery, a homogeneous climate is created across the whole of the greenhouse and a low temperature heating system can be used and energy distribution losses are reduced. Specifically, energy and water in the air from the crop space can be re-used efficiently and no energy is wasted for transporting unconditioned and conditioned air to and from the climate control chamber, respectively. In other words, since both the processes of air conditioning—which includes heating, cooling, humidification and dehumidification—and air transport are carried out locally at multiple locations across the crop space, the air recirculation path from and to the crop space through the climate control chamber is short, so that any deviations in temperature and relative humidity levels in relation to the required climate in the crop space can be compensated with a minimum amount of heat and water exchange, since no energy and water is wasted, inter alia due to the absence of long-distance transport of air from and to the crop space.

Specifically, treating the air locally and having the greenhouse closed with good insulation enables to use low temperature heating systems such as heat pumps, which are over 400% more efficient than boilers in generating energy. It also reduces heat loss in distribution pipes. For example, reducing the flow temperature from 82° C. to 50° C. will reduce the heat loss by 55%. In addition, the climate becomes more homogeneous across the whole greenhouse due to even distribution of conditioned air. Furthermore, by having the heating system operating on low temperatures, waste heat from processes such as warehouse cooling can be used to improve efficiencies even further and heat recovery between sections can be implemented.

Due to the local climate creation and delivery enabled by the specific configuration of the climate control chamber and its specific location in the interior space, an optimized climate can be created and delivered to the crops without exposing the crops to e.g. high air velocities which negatively affect the growth and health of the crops to be grown. In other words, since the chamber is arranged to create and deliver the required climate close to the crops, only a gentle air flow already suffices to maintain the required climate in the crop space in most circumstances. For the sake of completeness, it is noted the climate control chamber according to claim 1 includes any arrangement of the chamber above and/or below and/or next to the crop space, as long as the at least one air inlet opening and the at least one air outlet opening of the climate control chamber are distributed across the crop space such that the chamber receives and delivers air from and to the crop space, respectively, locally at a plurality of locations distributed across the crop space, including e.g. a diagonal arrangement above and/or below the crop space, a perpendicular arrangement above and/or below and/or next the crop space, a two-dimensional array of chambers, for instance in the form of a grid, and the like.

Specifically, the specific configuration and location of the climate control chamber enables to provide a regulated continuous or intermittent flow of air inside the interior space.

Preferably, the locations of the plurality of locations are distributed across the crop space such that a substantially homogeneous climate is created in the crop space.

Preferably, the locations of the plurality of locations are distributed substantially evenly across the crop space. More preferably, the locations of the plurality of locations are distributed substantially evenly across substantially the whole of the crop space.

Since the enclosure is substantially airtight, heat, cold and water from the crop space are kept as much as possible inside the greenhouse, which allows for optimizing the climate in the crop space whilst using a minimum amount of energy. A further beneficial effect of the enclosure being substantially airtight is that the ingress of contaminants such as particulate matter, insects, bacteria, viruses and other microbes, such as molds, fungi, viroids may be prevented, or at least reduced, which presents a significant step forward in fully sustainable crop protection and in crop and human health through protecting the crop and humans from insects, bacteria and/or viruses and other microbes in the interior space of the greenhouse. Another advantage is that $CO_2$ is used much more efficiently as compared to fully vented greenhouses. Specifically, only $CO_2$ used by the plants plus the very limited volume of $CO_2$ that is lost due to limited air refreshment have to be added to the interior of the greenhouse.

For the sake of completeness, it is noted that the climate control chamber is configured to successively extract air from the crop space, condition the extracted air and deliver the conditioned air to the crop space. Preferably, the air displacement means and the air conditioning means are formed integrally with the climate control chamber, i.e. as one unit. More preferably, the air displacement means and the air conditioning means are arranged inside or near air inlet openings and/or air outlet openings of the climate control chamber.

It is noted that the term air conditioning is not confined to cooling. It may refer to the processes of cooling, heating, ventilating, disinfecting and/or controlling the humidity in the air and the like. Preferably, the air conditioning means are configured to heat, cool, humidify and dehumidify air, so as to be able to adapt to any difference between the required indoor climate inside the greenhouse, in particular in the crop space, and the outdoor climate outside the greenhouse.

Preferably, the air conditioning means comprise any units available on the market that are able to heat, cool, humidify, dehumidify, handle and/or disinfect air.

More preferably, the air conditioning means comprise a liquid-to-air heat exchanger.

Preferably, the climate control chamber is made of a solid material, a semi-solid material or a flexible material. The material may be transparent, semi-transparent or opaque. Preferably, the climate control chamber enclosure material is transparent to maximize the ingress of light into the crop space. Preferably, the material is made of glass, plastic, or the like. More preferably, the climate control chamber enclosure material is substantially air impermeable and/or substantially water impermeable. Preferably, at least a portion of a roof of the enclosure of the greenhouse forms part of the climate control chamber.

It is noted that the greenhouse according to the invention is not limited to any specific type of greenhouse, but includes any building structure for covered growth of all kinds of plants, such as vegetables, fruits, potatoes, pot plants, bedding plants, cut flowers, ornamentals, herbs, medicinal *Cannabis*, flowers and other types of organisms like algae and mushrooms etc. In addition, it is noted that although the climate control chamber is described in relation to its functioning inside a greenhouse, it may as well be used in any other building structure.

Moreover, the crops to be grown in the crop space are preferably provided as rows of crops, preferably in cultivation gutters, wherein the majority of the rows of crops is preferably arranged not parallel with gutters of a roof of the greenhouse. This particular crop row arrangement ensures that any air flow obstruction due to the presence of crops, in particular tall plants, inside the greenhouse is minimized, which benefits the free flow of air inside the greenhouse, thereby further contributing to the efficiency and effectiveness of the climate creation and delivery by the climate control chamber.

In a preferred embodiment, the air displacement means and the air conditioning means are formed by a plurality of fan coil units arranged onto the at least one air inlet opening and the at least one air outlet opening, each fan coil unit comprising a fan and a heat exchanging coil.

The fan draws in air such that it passes over a cooling or heating coil which cools or heats the air, respectively. An important beneficial effect of fan coil units is that they are efficient in terms of energy usage and functional in any climate, i.e. in any part of the world, in particular in hot and humid climates. In contrast, e.g. evaporative cooling systems do not work effectively and efficiently in hot and humid areas, since they rely on water evaporation to cool air. Therefore, whereas traditional greenhouses have to close down for at least part of the year when outdoor climate conditions are too hot and/or too humid, the greenhouse according to the present invention enables being fully operational throughout the year while providing an adequate indoor climate for efficient and thus economically viable crop growth.

In a preferred embodiment, the plurality of fan coil units comprises inflow fan coil units and outflow fan coil units arranged such that air from the crop space is drawn into the climate control chamber through the inflow fan coil units and blown out of the climate control chamber towards the crop space through the outflow fan coil units.

In a further preferred embodiment, the inflow fan coil units and the outflow fan coil units are arranged such that the air from the crop space flows substantially horizontally into the climate control chamber through the inflow fan coil units and substantially vertically out of the climate control chamber towards the crop space through the outflow fan coil units, or vice versa.

In a preferred embodiment, each of the plurality of fan coil units is configured to adjust the speed of its fan so as to adjust the flow rate of air passing therethrough. In this way, the air flow rate in the interior space as well as the heat exchange rate can be controlled.

In a preferred embodiment, each of the plurality of fan coil units is configured to control the temperature of its coil so as to heat or cool the air passing therethrough. In this way, the amount of heat exchange per unit volume of air can be adjusted, so that the air conditions can be controlled.

In a preferred embodiment, at least one temperature sensor and/or at least one humidity sensor and/or at least one $CO_2$-sensor is provided in the crop space and/or near the climate control chamber.

Preferably, at least one temperature sensor and/or at least one humidity sensor and/or at least one $CO_2$-sensor is provided in the climate control chamber.

The temperature and/or humidity and/or $CO_2$ sensors in the crop space, the climate control chamber and/or near the climate control chamber allow an operator of the greenhouse to monitor the climate conditions in various parts of the interior space, in particular in the climate control chamber, so as to be able to determine the effectiveness of the chamber. Specifically, in order to be able to create and deliver optimal climate conditions in the crop space, the amount of heat exchange in the climate control chamber is accurately controlled on the basis of measured temperatures and relative humidity levels by temperature sensors and humidity sensors provided in the crop space and the climate control chamber. For accurate climate optimization, each fan coil comprises a fan, the speed of which is adjustable, so that the air flow rate can be controlled. In addition, the heat exchange rate of the coil can be adjusted.

Preferably, the greenhouse is provided at its outside with least one temperature sensor and/or at least one humidity sensor to measure the outdoor climate conditions. By continuously monitoring the climate externally, inside the crop space and/or the climate control chamber, the heating and/or cooling provided by the fan coils can be adapted to maximize efficiency and provide variable temperatures in different areas within the crop space. For example, crops at south facing parts of the greenhouse might have higher solar gains than other parts, so that part of the greenhouse might need cooling whilst other parts might need heat.

In a preferred embodiment, air disinfection means are provided near or in the climate control chamber. Preferably, the air disinfection means comprise an air disinfection light, such as a UV light, to reduce or eliminate insects and microbes such as lice, white fly, *thrips*, bacteria, yeasts, fungi, and viruses that might be present in the air. This can also be other disinfecting means, like a heating device or use of ozone.

In a preferred embodiment, the climate control chamber extends between one of opposing side walls and opposing end walls of the greenhouse.

In a preferred embodiment, the climate control chamber comprises multiple climate control chambers extending parallel to each other.

In a preferred embodiment, the greenhouse further comprises in the crop space a network of pipes provided in the proximity of the crops to be grown, wherein the network of pipes is connected to a source and a sink of hot or cold fluid and a pump for pumping the fluid through the pipes.

In this way, hot or cold water and/or a refrigerant can be pumped through the network of pipes to provide heating, cooling and/or dehumidification of the air to improve the climate conditions within the greenhouse in the proximity of the cultivated crop. Dehumidification will be effected by pumping cold water or refrigerant through the pipes, causing condensation on the pipes. Preferably, this condensate is collected by a gutter and/or any other type of recipient below the network and re-used by pumping it back to a water treatment plant or used directly without further conditioning. In this way, water is harnessed, thereby saving resources.

In a preferred embodiment, the greenhouse further comprises a climate preparation system being in fluid communication with the interior space so as to supply fresh air to the crop space and/or the climate control chamber and being configured to pre-condition the fresh air, comprising an intake opening through which outside air from the external environment of the greenhouse can enter an interior of the climate preparation system, an air pre-conditioning means configured to adjust the temperature and humidity of the air inside the climate preparation system so as to pre-condition the air before it is supplied to the crop space and/or the climate control chamber, respectively, downstream of the air pre-conditioning means, a delivery opening through which air being pre-conditioned by the air pre-conditioning means is to be delivered to the crop space and/or the climate control chamber, respectively, and upstream of the air pre-conditioning means, a transfer opening through which one end of the climate control chamber is in fluid communication with the climate preparation system.

The climate preparation system enables additional control of the climate in the crop space, i.e. in addition to the climate control provided by the climate control chamber. Thereto, the climate preparation system is configured to supply outside air, optionally pre-conditioned by the air pre-conditioning means, as fresh air to the crop space and/or to the climate control chamber through the delivery opening. As the climate control chamber is in fluid communication with the climate preparation system through the transfer opening, any heat gain in the interior space of the greenhouse can be recovered through the climate control chamber and the climate preparation system, so that it is not dispersed directly into the outside atmosphere. The climate preparation system is thus a separate system configured to pre-condition outside air before entering the interior space of the enclosure, preferably near or in the crop space and/or in the climate control chamber.

In a preferred embodiment, the transfer opening is near the intake opening of the climate preparation system. In this way, outside air can be heated, cooled, humidified or dehumidified by air from the climate control chamber, depending on the conditions of the air in the climate control chamber and the outside air.

In a preferred embodiment, the climate preparation system is configured to create an overpressure in the interior space with respect to the air pressure in the climate preparation system such that ingress of unwanted items from outside the greenhouse is avoided.

In a preferred embodiment, the greenhouse comprises a fan near the transfer opening so as to create a flow of air in the climate control chamber towards the climate preparation system.

In a preferred embodiment, the air pre-conditioning means comprise an air-to-air heat exchanger near the transfer opening. The air-to-air heat exchanger can heat or cool incoming outside air with air that is being discharged from the climate control chamber. For example, if the temperature inside the greenhouse is 20° C. and the outside temperature is 10° C., the heat energy in the air being discharged from the climate control chamber can heat the outside air entering the climate preparation system up to 18° C., keeping 80% of the energy inside the greenhouse. The same applies the other way around, i.e. in a situation in which the outside air temperature is higher than the temperature of the air inside the greenhouse.

Preferably, thermal energy recovered from the air expelled from the climate control chamber is also or instead used to heat water or to heat another interior space of the greenhouse or another greenhouse.

In a preferred embodiment, the climate preparation system comprises near the transfer opening means for recovering water from the air to be expelled from the climate control chamber.

In a preferred embodiment, the climate preparation system comprises an air filter covering the intake opening. The filter stops any ingress of any unwanted pollution, insects or microbes.

In a preferred embodiment, the air pre-conditioning means comprise a heat exchanger between the intake opening and the delivery opening. The heat exchanger can heat and/or cool if external air conditions are extreme, e.g. if there is a temperature difference of 20° C. or more between the outside air and the air in crop space.

In a preferred embodiment, the climate preparation system comprises in its interior air disinfection means. The air disinfection means preferably comprise an air disinfection light, such as a UV light, to reduce or eliminate e.g. bacteria, yeasts, fungi, microbes and viruses that might be present in the air.

In a preferred embodiment, the climate preparation system comprises an air discharge opening arranged between the intake opening and the transfer opening, through which air from the climate control chamber can be discharged to the external environment. This allows for discharging air to the external environment in cases where the air in the interior space needs to be expelled in order to meet the climate requirements in the crop space. In these cases, the climate preparation system is preferably configured such that the air from climate control chamber to be discharged and the outside air to be introduced into the climate preparation both bypass the air-to-air heat exchanger.

In a preferred embodiment, the air pre-conditioning means comprise a heat exchanger arranged between the air-to-air heat exchanger and the filter and/or between the air-to-air heat exchanger and the delivery opening. This heat exchanger allows for further control over the pre-conditioning process delivered by the climate preparation system.

In a preferred embodiment, the climate control chamber is arranged in one or more bays of the greenhouse. Preferably, at least a portion of a roof of the one or more bays forms part of the climate control chamber.

In a preferred embodiment, the climate control chamber is arranged below one or more gutters arranged between one or more bays of the greenhouse. An advantage thereof is that the climate control chamber does not cause an additional amount of shade in the crop space, since the gutters are typically opaque. Preferably, the climate control chamber is attached to the one or more gutters. The gutters are typically the strongest part of a greenhouse, so that they provide strength and support to the climate control chamber.

In a preferred embodiment, the climate control chamber is arranged in one or more pyramid-shaped roof structures of the greenhouse.

It is noted that the heat exchangers of the climate preparation system can be any type of heat exchanger, such as an air-to-air heat exchanger, a liquid-to-air heat exchanger or a solid-to-air heat exchanger.

Preferably, the climate preparation system optionally comprises a chimney, duct, flue or similar means to create a natural draft for a backup fresh air supply.

To achieve the desired control of the climate inside the greenhouse, various pieces of equipment is preferably used directly or in a technical equipment area, where a heating and cooling system can be arranged and where other technical equipment relevant to climate, water and air treatment can be arranged.

The heating and/or cooling substance is preferably water or a mix of liquids, which may be heated and/or cooled by means of heat pumps, boilers, water chillers, refrigeration, solar or direct air cooling from the outside as examples.

Preferably, the distribution of air between the different parts and systems of the greenhouse could be direct or indirect through, but not limited to, ducts, pipes or similar air distribution equipment.

Preferably, the climate preparation system, the climate control chamber and the crop space are configured to monitor and/or automatically adjust various parameters to optimize the output of the greenhouse, including one or more of external ambient temperatures, internal ambient temperatures, preferably at different height levels and locations within the greenhouse, carbon dioxide levels, oxygen levels, carbon monoxide levels, condensation at various locations, relative humidity levels, ester levels, air pressure (for vapor pressure differential), air flow for equilibrating fresh air coming into the greenhouse and water temperatures.

The greenhouse is thus preferably designed to be controllably closed and provide a fully controllable environment.

The greenhouse may have more than one interior space, depending on the internal configuration. For example, the greenhouse may have more than one floor. The greenhouse may be a structure with a roof and walls, or any other covered enclosure including a dome-shaped structure.

Preferably, the greenhouse is provided with artificial lighting for growing plants.

The external walls of the greenhouse and/or the roof of the greenhouse and/or the roof of the climate control tunnel may have a greater level of insulation and strength against the external environment than the internal walls. For example, the roof of the climate control tunnel may comprise of membrane with pressurized air (preferably dry air) in between to provide insulation. These layers provide increased resilience to extreme weather conditions such as hail storms.

The roof of the greenhouse may be made from glass or other light transmitting materials such as, plexiglass, plastic, acrylic or polycarbonate. The external walls of the greenhouse may be made from glass or other light transmitting materials such as, plexiglass, plastic, acrylic or polycarbonate or out of solid building materials or a double layer of membrane pressurized with air, as described above.

By maintaining an internal positive air pressure within the interior space, the ingress of air from outside the interior space is preferably controlled and minimized.

An airlock may be provided in the form of an airlock chamber provided separately from or integrally with the greenhouse. Such an airlock chamber seeks to define a variable pressure region for locating between the external environment and the internal environment of the interior space. A doorway may be provided into the airlock chamber from the external environment and a doorway may be provided out of the airlock chamber into the interior space: each doorway is preferably sealable to minimize air ingress.

The airlock chamber, if present, is preferably designed to minimize a change in pressure, a change in temperature and a change in air humidity within the interior space on entry to the interior space.

Whilst the present invention is specifically described in relation to a greenhouse application, it is applicable to other types of buildings, including residential, educational, institutional, business, industrial and storage buildings. The greenhouse application is described and illustrated because it presents particularly challenging conditions to address.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification, wherein:

FIG. 8 shows a top of again another preferred embodiment of the greenhouse according to the present invention;

FIG. 9 shows a front view of a vertical cross-section of the embodiment of FIG. 8 taken along the dash-dotted line.

Figure 1:
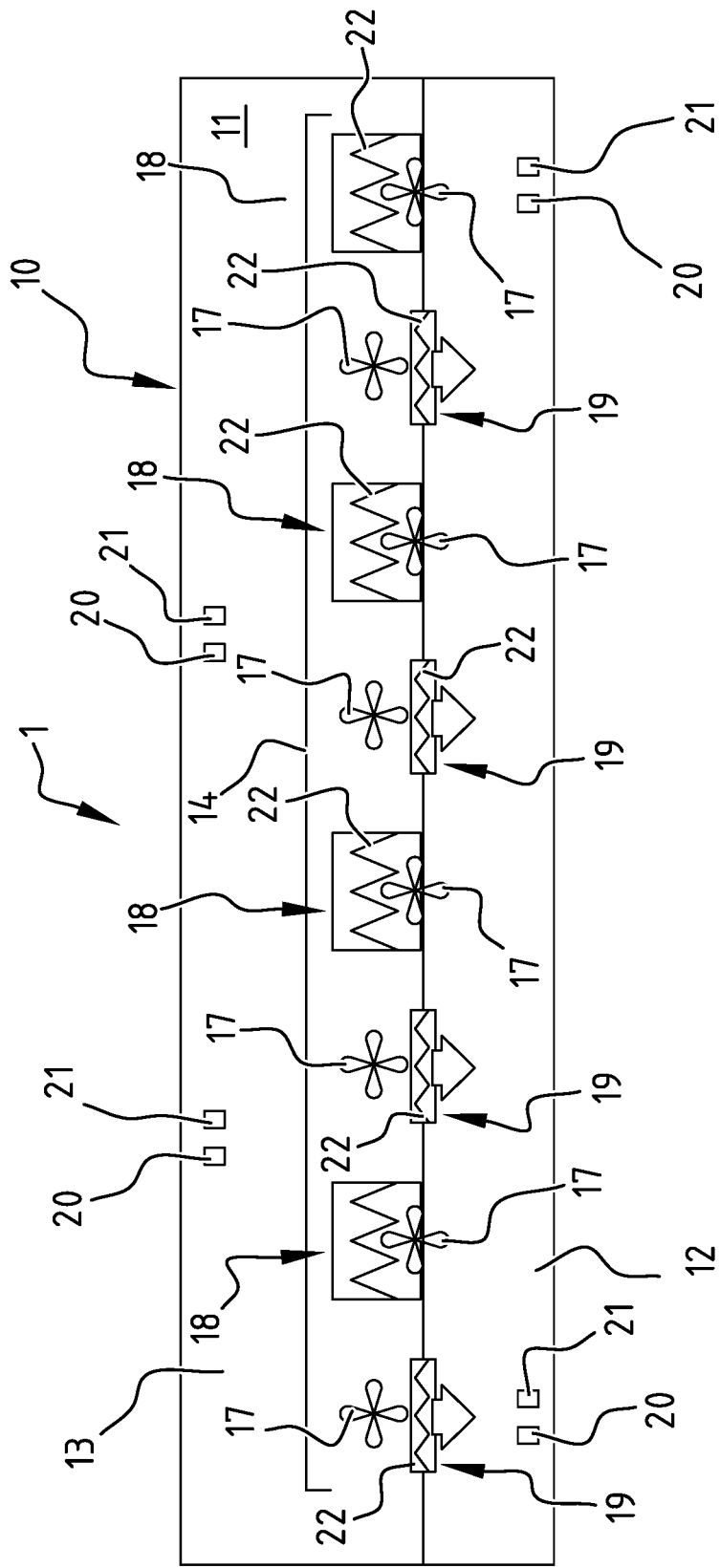
FIG. 1 shows a side view of a preferred embodiment of the greenhouse according to the present invention.
Figure 2:
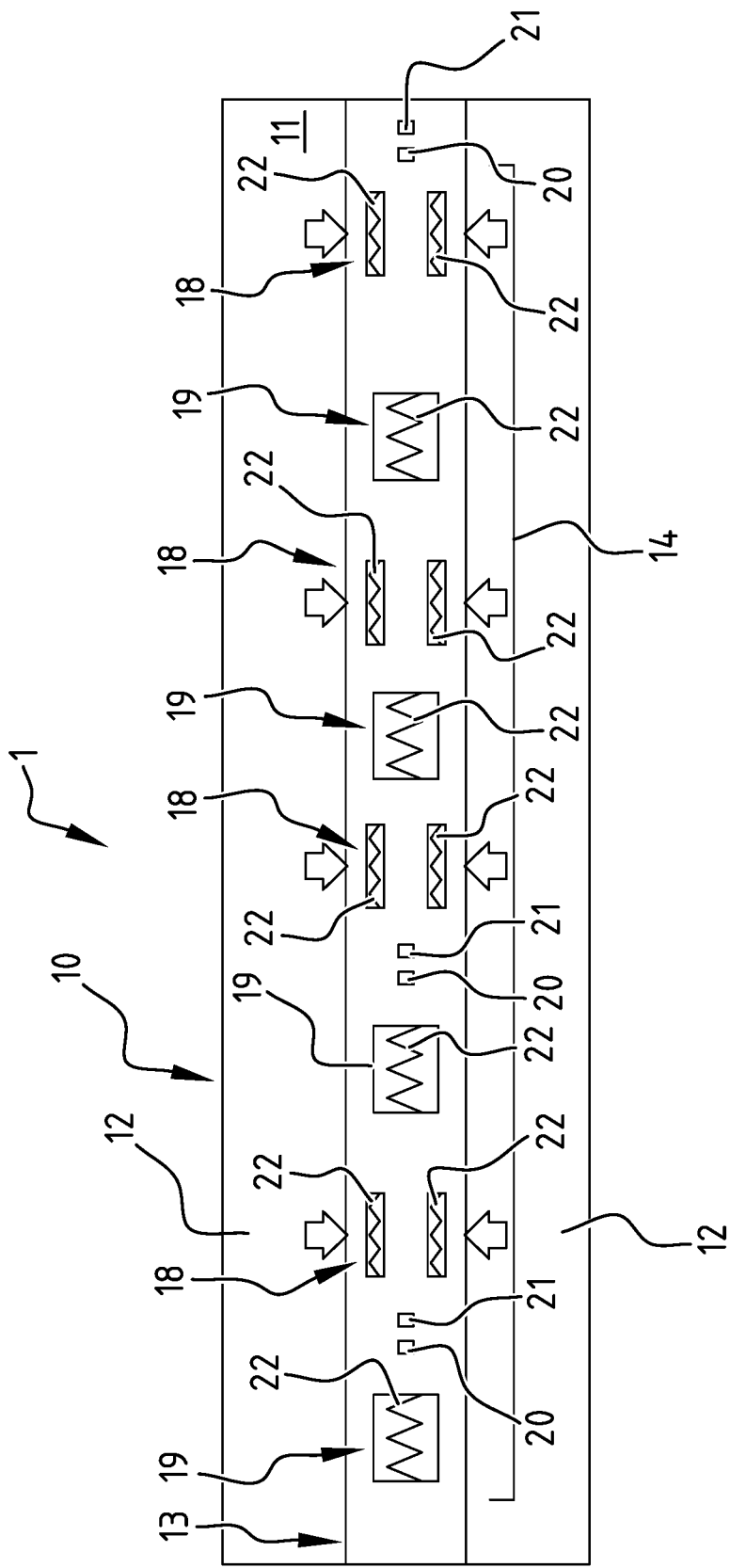
FIG. 2 shows a top view of the embodiment shown in FIG. 1.
Figure 3:
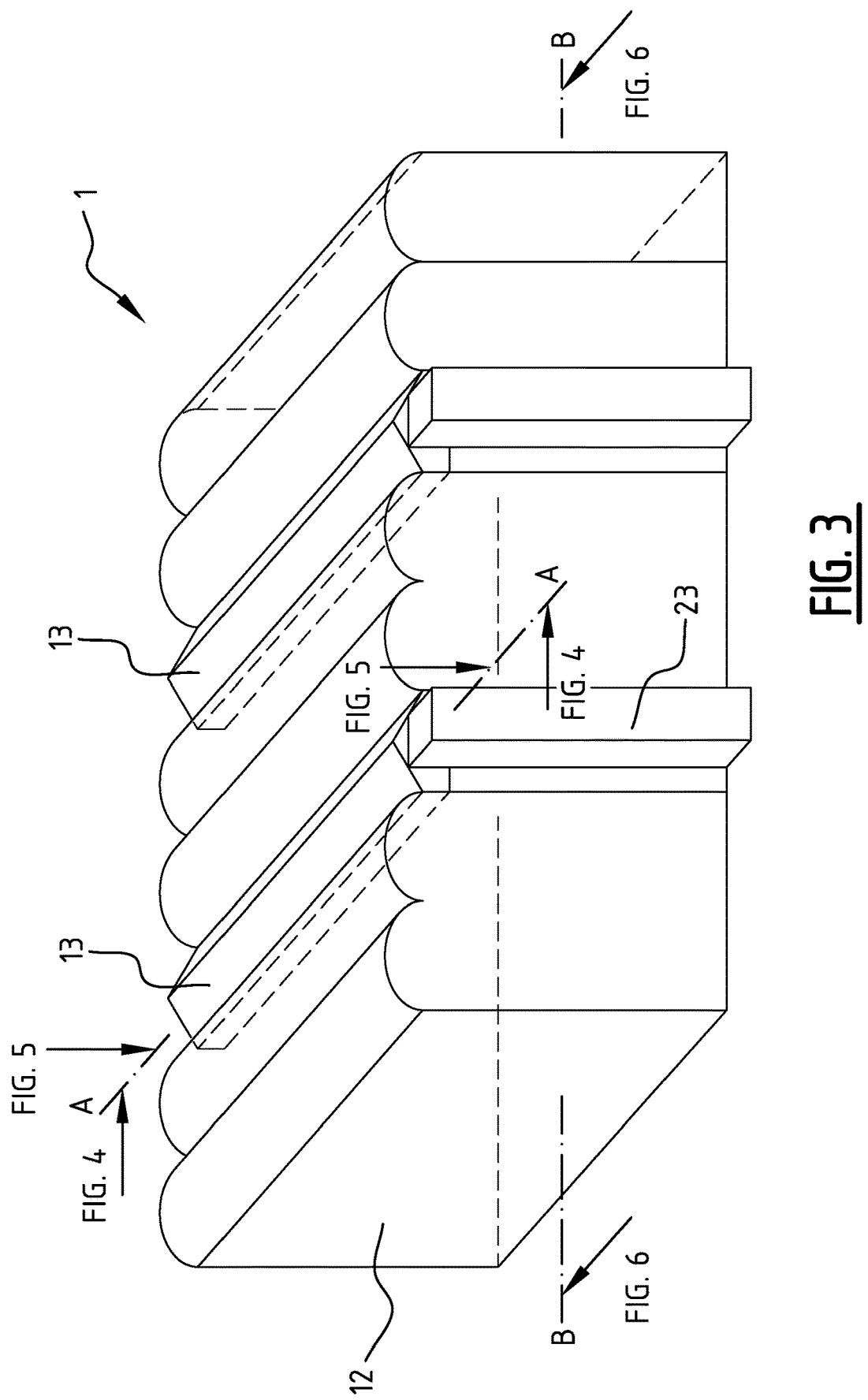
FIG. 3 shows a perspective view of a further preferred embodiment of the greenhouse according to the present invention.

The greenhouse 1 according to the present invention enables a resource-efficient and outdoor climate-independent control of the climate therein. Thereto, in its simplest form, as shown in FIGS. 1 and 2, the greenhouse 1 is arranged as an airtight enclosure 10 having an interior space 11, which comprises a crop space 12 within which crops 16 are to be grown, and a climate control chamber 13 in fluid communication with the crop space 12. The climate control chamber 13 comprises air inlet openings and air outlet openings through which an interior of the chamber is in fluid communication with the crop space 12. Onto the air inlet openings and the air outlet openings a plurality of fan coil units 14 are arranged (in other embodiments, the configuration of air displacement means and air conditioning means may be different. For instance, fans may be placed near the air inlet openings and/or the air outlet openings and one or more heat exchangers may be arranged inside the climate control chamber 13). These fan coil units 14 are configured to create an air flow from the crop space 12 to the interior of the climate control chamber 13 through the air inlet openings and from the interior of the climate control chamber 13 to the crop space 12 through the air outlet openings as well as to condition air in the interior of the climate control chamber 13 such that a conditioned climate is created in the interior of the chamber 13 so as to control the climate in the crop space 12. As best seen in FIGS. 1, 2, 4, 5, 6, 7 and 9, the air inlet openings and the air outlet openings of the climate control chamber(s) 13 are distributed across the crop space such that the chamber(s) 13 receives and delivers air from and to the crop space, respectively, locally at a plurality of locations distributed across the crop space. As a result, an optimized climate can be created and delivered to the crops 16 without exposing the crops 16 to e.g. high air velocities which negatively affect the growth and health of the crops 16 to be grown. In other words, since the chamber 13 is arranged to create and deliver the required climate close to the crops 16, only a gentle air flow already suffices to maintain the required climate in the crop space 12 in most circumstances.

The climate control chamber 13 is a critical element in enabling optimized climate creation and delivery to the crops 16. Circulating air between the crop space 12 and the climate control chamber 13 can provide all of the elements required for the crop space 12, such as heating, cooling and dehumidification whilst using minimum amount of energy and at the same time harnessing any surplus water.

The climate control chamber 13 is based on air entering the climate control chamber 13 on the side of the chamber and then discharge it from the bottom of the climate control chamber 13 back into the crop space 12 or vice versa, which can be through natural ventilation or through mechanical equipment such as fans or blowers 17.

Specifically, the air inlet openings and the air outlet openings of the climate control chamber 13, through which fluid communication exists between the climate control chamber 13 and the surrounding area of the crops space 12, are provided with inflow fan coils 18 and outflow fan coils 19. The air in the crop space 12 is drawn into the climate control chamber 13 through these inflow fan coils 18 and blown from the climate control chamber 13 into the crop space 12 of the greenhouse 1 via the outflow fan coils 19. Each inflow fan coil 18 and outflow fan coil 19 can heat, cool and dehumidify the air to provide the desired climate in the crop space 12. The inflow fan coils 18 and outflow fan coils 19 can be heated/cooled directly, using electricity or by a liquid such as water and/or glycol or a mix of liquids or a refrigerant. To be able to create and deliver optimal climate conditions for the crop space 12, the amount of heat exchange in the climate control chamber 13 is accurately controlled on the basis measured temperatures and relative humidity levels by temperature sensors 20 and humidity sensors 21 provided in the crop space 12 and in the climate control chamber 13. For accurate climate optimization, each fan coil comprises a fan 17, the speed of which is adjustable, so that the amount of heat exchange can be controlled. In addition, the heat exchange rate of each coil 22 can be adjusted.

The transpiration of water from the crops 16 grown in the crop space 12 can result in condensation of this water on the walls and ceilings of the enclosure 10 of the greenhouse 1 and/or the climate control chamber 13, which can be recovered through e.g. gutters or the like (not shown).

Air disinfection means (not shown), such as UV lights, may also be arranged at any point in the climate control chamber 13.

In a further preferred embodiment, as shown in FIGS. 3 to 6, the end of the climate control chamber 13 is connected at one of the end walls of the enclosure 10 of the greenhouse 1 to a climate preparation system 23, which is arranged outside the enclosure 10 (alternatively or additionally, the system 23 can also be arranged inside enclosure 10 (not shown)) and which is in fluid communication with the crop space 12 for supplying fresh air thereto and which is configured to pre-condition the fresh air.

Fresh air may enter the climate preparation system 23 through an intake opening 24 and a filter 25 which stops any ingress of unwanted insects and other unwanted microbes. Sensors 30, 31 are provided to monitor the relative humidity levels and temperature of the incoming air. If the relative humidity levels are considered too high (based on an adjustable set point), hot or cold fluid (which can be water or refrigerant or any other type of fluid) will be pumped through a fluid-to-air heat exchanger 26, e.g. heating and/or cooling coil 26. This heat exchanger 26 can be used to add heating and/or cooling if outside temperatures are extreme, i.e. +/−20° C. compared to the temperature in the crop space 12.

The incoming air goes through an air-to-air heat exchanger 27 which heats or cools the incoming air with the air that is being discharged from the climate control chamber 13. For example, if the temperature inside the crop space 12 of the greenhouse 1 is 20° C. and the outside temperature is 10° C., the heat energy in the air being discharged from the climate control chamber 13 can heat the outside air entering the climate preparation system 23 up to 18° C., keeping 80% of the energy inside the greenhouse 1. The same applies the other way around, i.e. in a situation in which the outside air temperature is higher than the temperature of the air inside the greenhouse 1.

A second set of temperature and humidity sensors 40, 41 is arranged in the climate preparation system 23 downstream of the filter 25, air-to-air heat exchanger 27 and fluid-to-heat exchanging coil 26. This second set of sensors 40, 41 provides valuable information for the climate control system as to whether further heating, cooling or humidification is needed.

Figure 4:
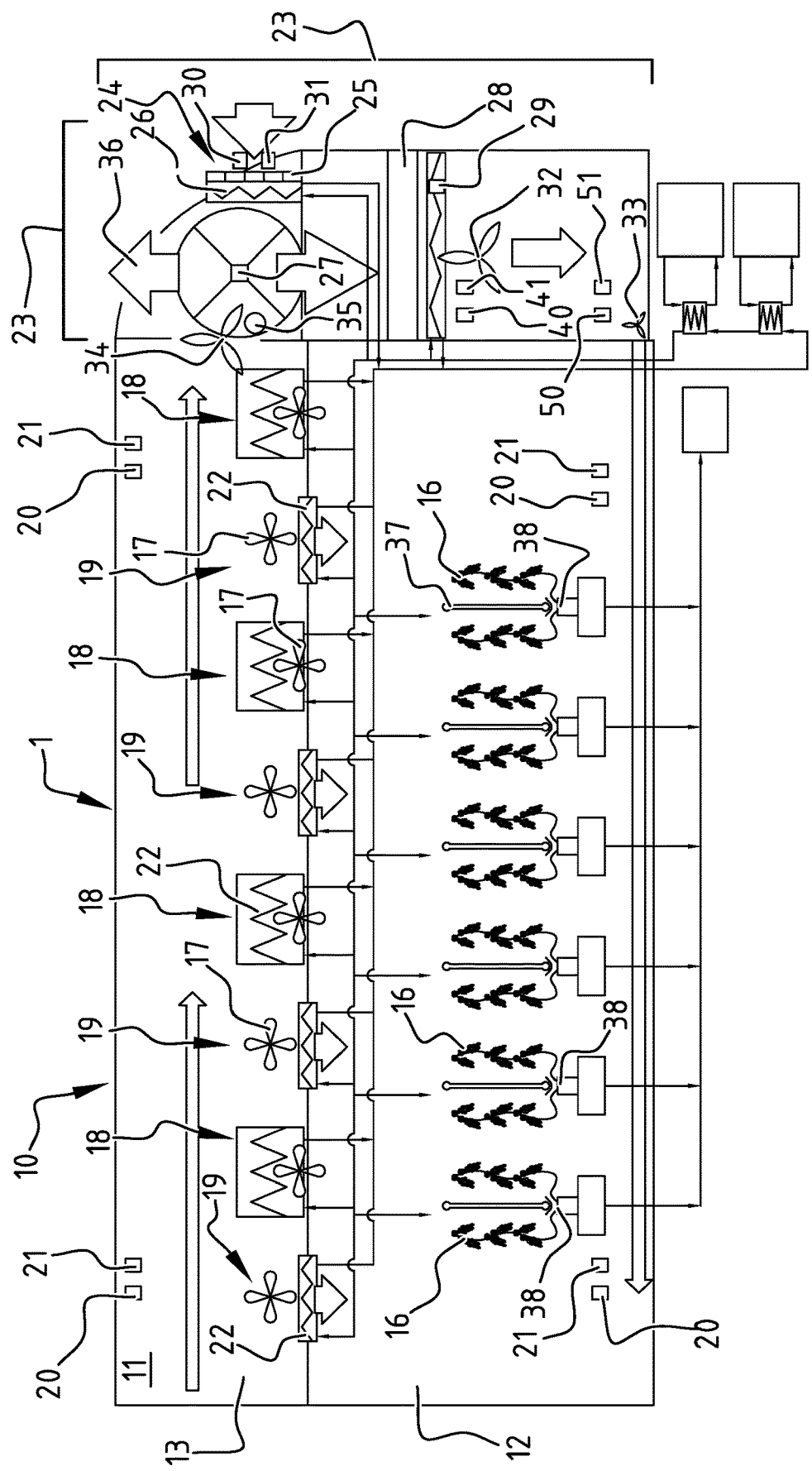
FIG. 4 shows a side view of a vertical cross-section of the embodiment of FIG. 3 taken along the line A-A.
Figure 5:
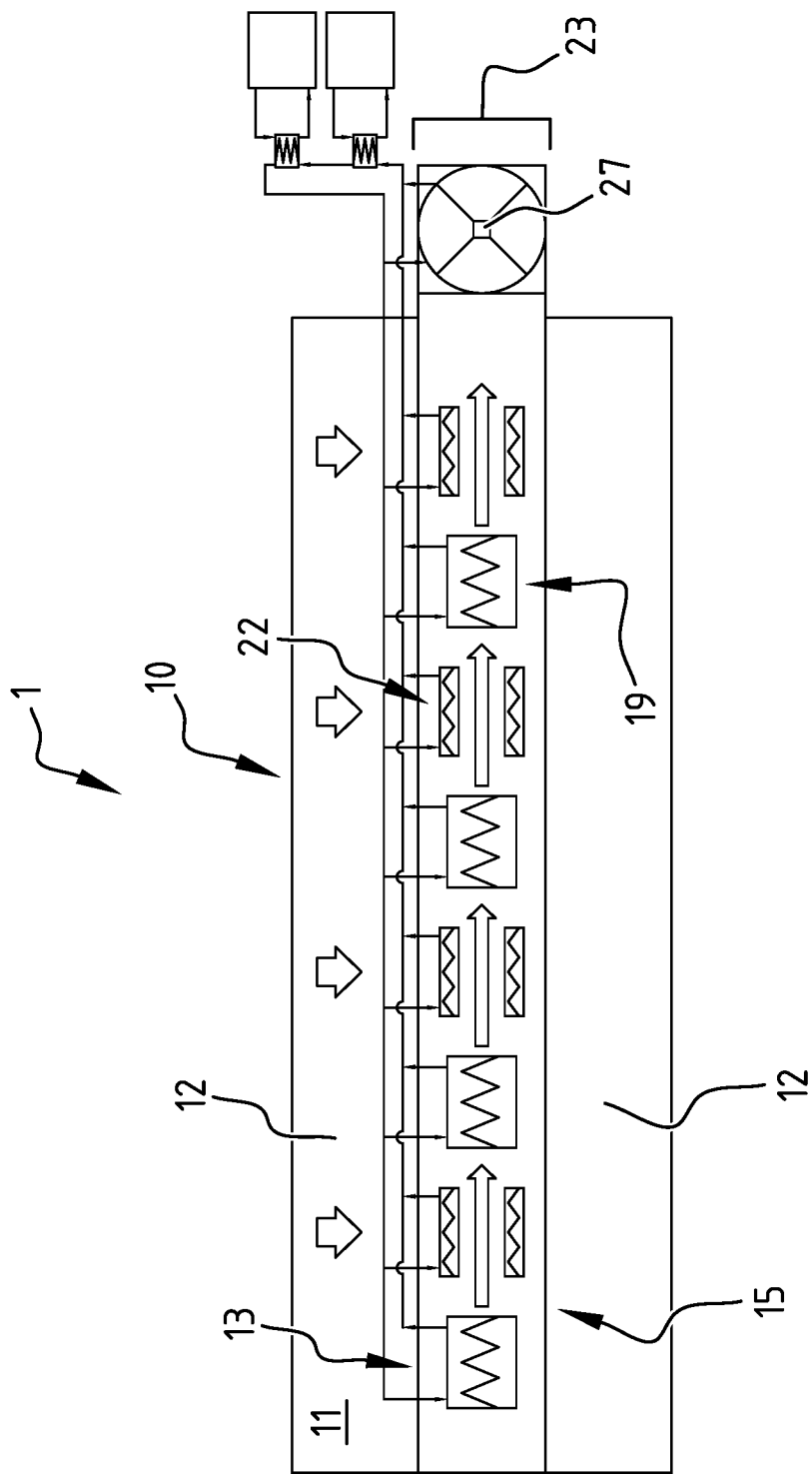
FIG. 5 shows a top view of a horizontal cross-section of the embodiment of FIG. 3 taken along the line A-A.

Air disinfection lights 28 are arranged in the climate preparation system 23 to kill any bacteria or viruses that may enter the climate preparation system 23 to ensure they do not reach the crop space 12. Although the air disinfection lights 28 of FIG. 4 are arranged directly below the air-to-air heat exchanger 27, these lights 28 may be arranged at any place or several places in the climate preparation system 23.

Downstream of the air disinfection lights 28 an additional fluid-to-air heat exchanger 29 is arranged in the climate preparation system 23. The fluid in both fluid-to-air heat exchangers 26, 29 is pumped and can be either hot or cold depending on the measurement data taken by the second set of temperature and humidity sensors 40, 41 and the set points set by the operator of the greenhouse.

Fans 32, 33 control the air volume going through the climate preparation system 23. This volume is adapted depending on the demand of the crop space 12 and is set by an operator or is computer controlled.

A third set of temperature and humidity sensors 50, 51 is arranged after all of the heat exchangers 26, 27, 29 at the point where the air exits the climate preparation system 23 and enters the crop space 12.

Moreover, the greenhouse 1 is provided at its outside with a temperature sensor 60 and a humidity sensor 61 to measure the outdoor climate conditions. By continuously monitoring the climate externally, inside the crop space 12 and/or in the climate control chamber, the heating and/or cooling provided by the fan coils 14 can be adapted to maximize efficiency and provide variable temperatures in different areas within the crop space 12 in the greenhouse 1. For example, crops at south facing parts of the greenhouse 1 might have higher solar gains than other parts, so that part of the greenhouse 1 might need cooling whilst other parts might need heat.

Air from the climate control chamber 13 is pushed or drawn to the end wall where it connects to the climate preparation system 23 using a fan 34. A damper 35 is arranged in the climate preparation system 23 where air from the climate control chamber 13 enters the climate preparation system 23, which increases the control capacity of the system, especially if high dehumidification is required. This is controlled by a thermostat (not shown) and is based on measurement data taken by the humidity sensors 20, 21 in the crop space and set points set by the operator of the greenhouse 1.

Furthermore, the climate preparation system 23 comprises an air discharge opening 36 for discharging air to the external environment, which may be necessary if the air in the interior space 11 needs to be expelled in order to meet the climate requirements in the crop space 12.

Figure 6:
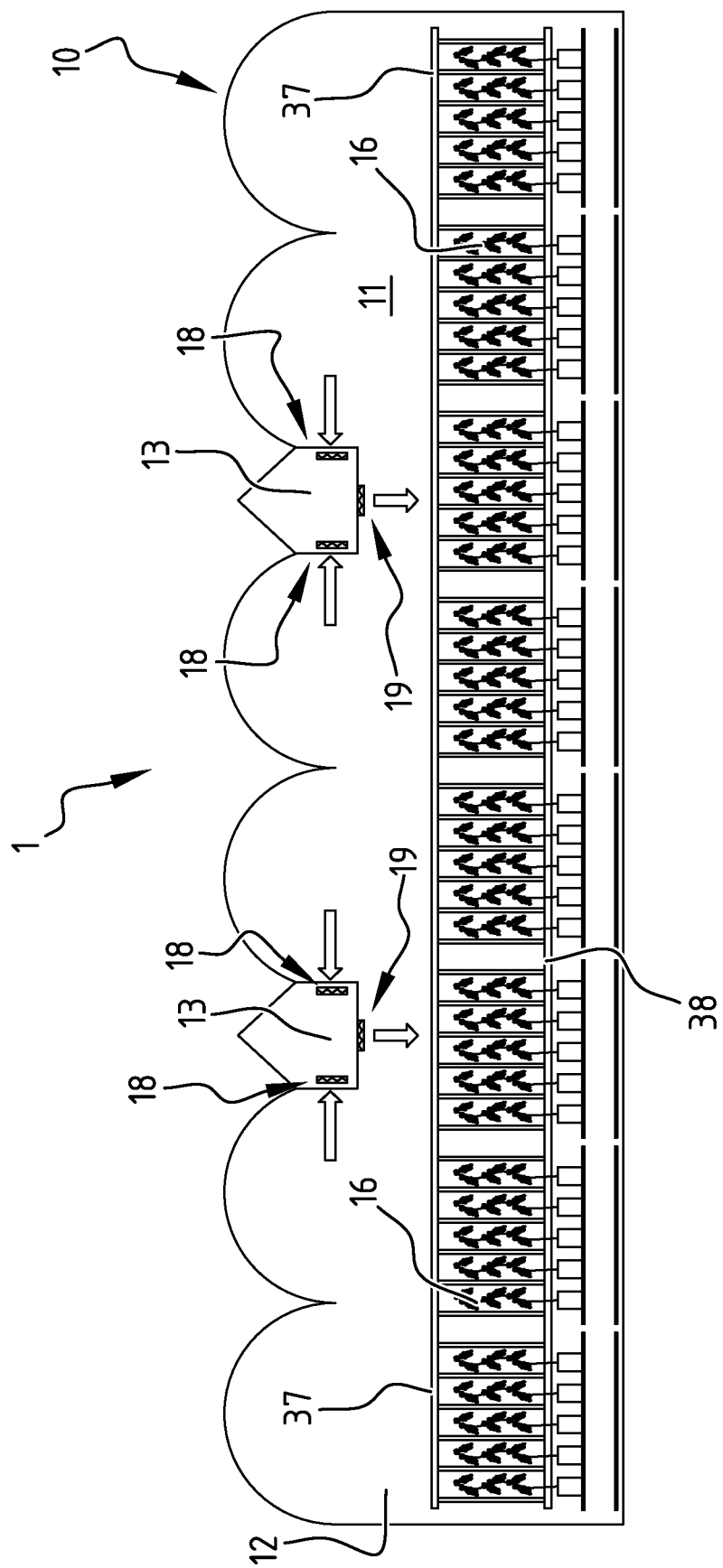
FIG. 6 shows a front view of a vertical cross-section of the embodiment of FIG. 3 taken along the line B-B.

In addition to the climate control chamber 13 and the climate preparation system 23, a network of pipes 37 can be arranged between the crops in the crop space. As can be seen in FIG. 6, network of pipes 37 is arranged in such a way that it looks like a ladder lying on its side. Nevertheless, it can also be any other design including, but not limited to, a construction of X shaped/crossing pipes. The pipes can be a variety of thickness and be made out of various materials, including plastic, multilayer, metal or a mix of materials.

In any case, the pipes 37 are connected with a source and a sink of hot or cold water and/or refrigerants. The hot and cold water and/or a refrigerant is pumped through the network of pipes 37 to provide heating, cooling and/or dehumidifying to improve the conditions within the greenhouse 1, and/or in the proximity of the cultivated crop 16.

The network 37 can be connected to a heat exchanger or multiple heat exchangers which can be directly or indirectly heated and/or cooled to supply a variable temperature to the pipes 37. If a refrigerant is used, it can be heated or cooled, either directly or indirectly through a secondary refrigerant and/or another liquid. Hot water and cold water storage can be used for this purpose and the mechanical equipment can be used to control the temperature of the liquid in the hot and/or cold water storage tanks.

The heating and/or cooling media and substance can be electric, a refrigerant and/or a liquid such as water or a mix. The dehumidification will be effected by pumping cold water or refrigerant through the pipes 37, causing condensation on the pipes 37. This condensate is caught by a gutter 38 below the ladder and could be re-used by pumping it back to a water treatment plant or used directly without further conditioning.

In the preferred embodiment shown in FIGS. 3 to 6, the top walls of the climate control chamber 13 are formed and defined by the roof of the greenhouse 1, which is typically made from transparent or semi-transparent material. Hence, if the bottom wall and the side wall of the climate control chamber 13 are for instance opaque, the climate control chamber 13 will cause shade in the crop space 12, which may negatively affect the growth conditions for the crops 16 in the crop space 12.

Figure 7:
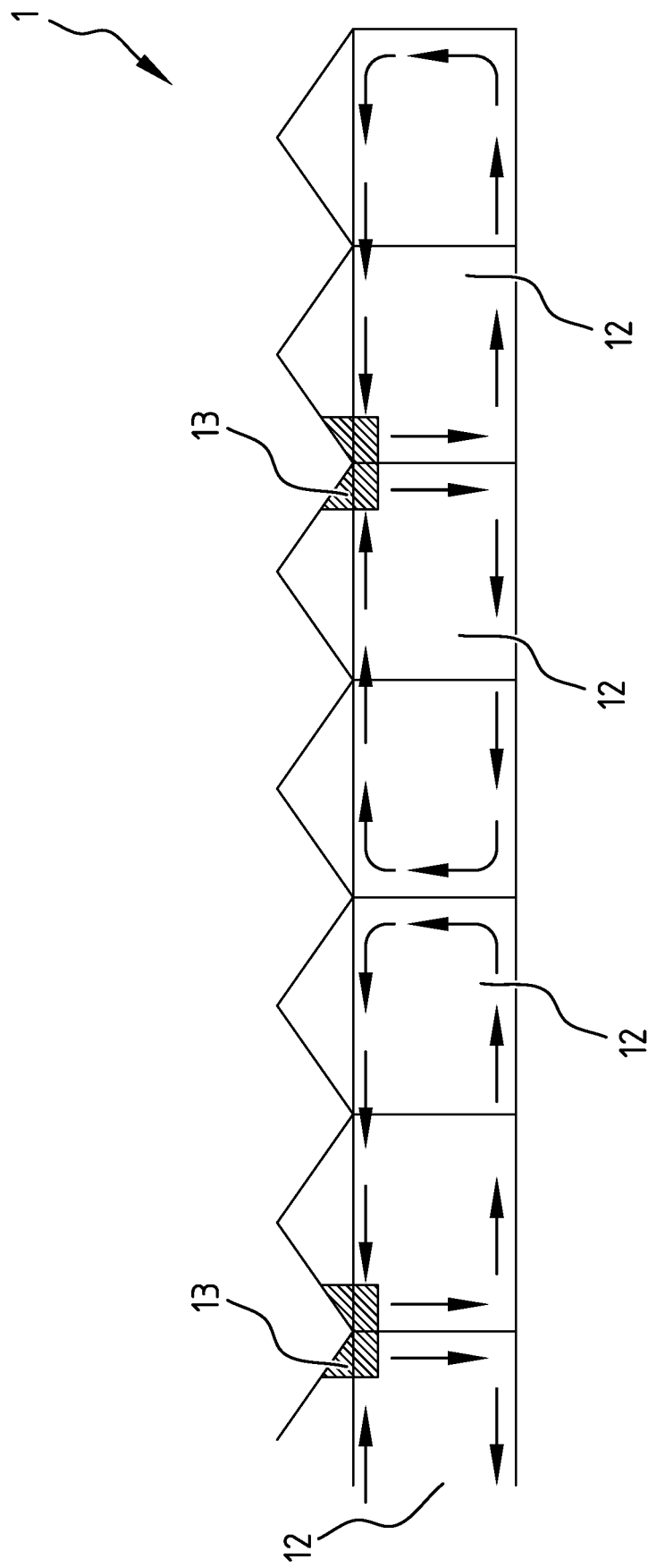
FIG. 7 shows a front view of another preferred embodiment of the greenhouse according to the present invention.

In an alternative embodiment, the climate control chamber 13 is at least partly arranged below the gutters of the greenhouse 1—see FIG. 7, which shows a front view this alternative embodiment of the greenhouse 1. The gutters are typically opaque elements, so that due to the arrangement of the climate control chamber 13 below the gutter, the climate control chamber 13 does not cause an additional amount of shade in the crop space 12. The air flow directions inside crop space 12 are also shown in FIG. 7, which moreover shows the entrance of the air from the crop space 12 on the sides of the chambers 13 and the delivery of the conditioned air from the bottom of the chambers 13. A further advantage of the embodiment shown in FIG. 7 is that the gutters are typically the strongest part of the greenhouse 1, so that they provide strength and support to the climate control chambers 13.

In another embodiment, multiple climate control chambers 13 are arranged in pyramid-shaped roof structures of the greenhouse 1—see FIGS. 8 and 9. In FIG. 8, a greenhouse 1 is shown, which is comprised of three sections (separated by the dark vertical lines), wherein the roof of the left section comprises nine pyramid-shaped roof structures. The roof of the middle section comprises three pyramid-shaped roof structures, and the roof of the right section comprises six pyramid-shaped roof structures. Below the pyramid-shaped roof structures, multiple climate control chambers 13 are arranged. As can be seen in FIG. 8, the climate control chambers are arranged in each section such that they are distributed substantially evenly across the crop space 12 such that the chambers 13 in each section receive and deliver air from and to the crop space 12, respectively, locally at a plurality of locations distributed across the crop space 12. The distribution of the climate creation and delivery points across the crop space 12 is thus mainly realized by the spatial distribution of the chambers 13. In contrast, in the embodiments of FIGS. 1 to 6, the distribution of the climate creation and delivery points across the crop space 12 is mainly realized by the spatial distribution of the air inlet openings and air outlet openings across each chamber 13.

The drawings are illustrative of selected aspects of the present disclosure, and together with the description serve to explain principles and operation of methods, products, and systems embraced by the present disclosure.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. Greenhouse, comprising a substantially airtight enclosure having an interior space, comprising:
    a crop space in which crops are to be grown; and
        a climate control chamber configured to control a climate in the crop space, comprising:
        a plurality of air inlet openings and a plurality of air outlet openings through which an interior of the climate control chamber is in fluid communication with the crop space;
        an air displacement means configured to create an air flow from the crop space to the interior of the climate control chamber through the plurality of air inlet openings, and from the interior of the climate control chamber to the crop space through the plurality of air outlet openings; and
    means for conditioning air configured to condition air in the interior of the climate control chamber such that a conditioned climate is created in the interior of the climate control chamber,
    wherein the climate control chamber is configured and located in the crop space relative to the crops to be grown such that the plurality of air inlet openings, the means for conditioning air, and the plurality of air outlet openings of the climate control chamber are spatially distributed in two dimensions across the crop space such that the climate control chamber receives, conditions, and delivers air from and to the crop space locally, that is close to the crops to be grown in the crop space, at a plurality of locations spatially distributed in the two dimensions across the crop space, so that air is conditioned locally at the plurality of locations spatially distributed in the two dimensions across the crop space and a substantially homogeneous climate is created across the crop space.

2. Greenhouse according to claim 1, wherein the locations of the plurality of locations are distributed substantially evenly across the crop space.

3. Greenhouse according to claim 1, wherein the air conditioning means comprise a liquid-to-air heat exchanger.

4. Greenhouse according to claim 3, wherein the air displacement means and the air conditioning means are formed by a plurality of fan coil units arranged onto the at least one air inlet opening and the at least one air outlet opening, each fan coil unit comprising a fan and a heat exchanging coil.

5. Greenhouse according to claim 4, wherein the plurality of fan coil units comprises inflow fan coil units and outflow fan coil units arranged such that air from the crop space is drawn into the climate control chamber through the inflow fan coil units and blown out of the climate control chamber towards the crop space through the outflow fan coil units.

6. Greenhouse according to claim 5, wherein the inflow fan coil units and the outflow fan coil units are arranged such that the air from the crop space flows substantially horizontally into the climate control chamber through the inflow fan coil units and substantially vertically out of the climate control chamber towards the crop space through the outflow fan coil units, or vice versa.

7. Greenhouse according to claim 4, wherein each of the plurality of fan coil units is configured to adjust the speed of its fan so as to adjust the flow rate of air passing therethrough.

8. Greenhouse according to claim 4, wherein each of the plurality of fan coil units is configured to control the temperature of its coil so as to heat or cool the air passing therethrough.

9. Greenhouse according to claim 1, wherein at least one temperature sensor and/or at least one humidity sensor and/or at least one CO2-sensor is provided in the crop space and/or near the climate control chamber.

10. Greenhouse according to claim 1, wherein at least one temperature sensor and/or at least one humidity sensor and/or at least one CO2-sensor is provided in the climate control chamber.

11. Greenhouse according to claim 1, wherein air disinfection means are provided near or in the climate control chamber.

12. Greenhouse according to claim 1, wherein the climate control chamber extends between one of opposing side walls and opposing end walls of the greenhouse.

13. Greenhouse according to claim 1, wherein the climate control chamber comprises multiple climate control chambers extending parallel to each other.

14. Greenhouse according to claim 1, further comprising in the crop space a network of pipes provided in the proximity of the crops to be grown, wherein the network of pipes is connected to a source and a sink of hot or cold fluid and a pump for pumping the fluid through the pipes.

15. Greenhouse according to claim 1, further comprising a climate preparation system being in fluid communication with the interior space so as to supply fresh air to the crop space and/or the climate control chamber and being configured to pre-condition the fresh air, comprising:
    an intake opening through which outside air from the external environment of the greenhouse can enter an interior of the climate preparation system;
    an air pre-conditioning means configured to adjust the temperature and humidity of the air inside the climate preparation system so as to pre-condition the air before it is supplied to the crop space and/or the climate control chamber, respectively;
    downstream of the air pre-conditioning means, a delivery opening through which air being pre-conditioned by the air pre-conditioning means is to be delivered to the crop space and/or the climate control chamber, respectively; and
    upstream of the air pre-conditioning means, a transfer opening through which one end of the climate control chamber is in fluid communication with the climate preparation system.

16. Greenhouse according to claim 15, wherein the transfer opening is near the intake opening of the climate preparation system.

17. Greenhouse according to claim 15, wherein the climate preparation system is configured to create an overpressure in the interior space with respect to the air pressure in the climate preparation system such that ingress of unwanted items from outside the greenhouse is avoided.

18. Greenhouse according to claim 15, comprising a fan near the transfer opening so as to create a flow of air in the climate control chamber towards the climate preparation system.

19. Greenhouse according to claim 15, wherein the air pre-conditioning means comprise an air-to-air heat exchanger near the transfer opening.

20. Greenhouse, comprising a substantially airtight enclosure having an interior space, comprising:
- a crop space in which crops are to be grown; and
- a plurality of climate control chambers configured to control a climate in the crop space, each comprising:
  - at least one air inlet opening and at least one air outlet opening through which an interior of the chamber is in fluid communication with the crop space;
  - an air displacement means configured to create an air flow from the crop space to the interior of the climate control chamber through the at least one air inlet opening, and from the interior of the climate control chamber to the crop space through the at least one air outlet opening; and
  - means for conditioning air configured to condition air in the interior of the climate control chamber such that a conditioned climate is created in the interior of the climate control chamber, wherein the plurality of climate control chambers are configured and spatially distributed in the crop space in two dimensions across the crop space such that the air inlet openings, the means for conditioning air, and the air outlet openings of the plurality of climate control chambers are spatially distributed in the two dimensions across the crop space such that the plurality of climate control chambers receive, condition, and deliver air from and to the crop space locally, that is close to the crops to be grown in the crop space, at a plurality of locations spatially distributed in the two dimensions across the crop space, so that air is conditioned locally at the plurality of locations spatially distributed in the two dimensions across the crop space and a substantially homogeneous climate is created across the crop space.

* * * * *